(12) United States Patent
Kochura et al.

(10) Patent No.: US 10,528,453 B2
(45) Date of Patent: ***Jan. 7, 2020

(54) SYSTEM AND METHOD FOR DETERMINING QUALITY METRICS FOR A QUESTION SET

(71) Applicant: International Business Machines Corporation, Armonk, NY (US)

(72) Inventors: Nadiya Kochura, Bolton, MA (US); Vinodkumar Raghavan, Westford, MA (US); Donald H. Randall, Jr., Austin, TX (US); Derek M. Reedy, Ayer, MA (US); Timothy B. Snow, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 972 days.

This patent is subject to a terminal disclaimer.

(21) Appl. No.: 15/054,393

(22) Filed: Feb. 26, 2016

(65) Prior Publication Data

US 2017/0206152 A1 Jul. 20, 2017

Related U.S. Application Data

(63) Continuation of application No. 15/001,698, filed on Jan. 20, 2016.

(51) Int. Cl.
*G06F 11/36* (2006.01)
*G06N 20/00* (2019.01)
(Continued)

(52) U.S. Cl.
CPC ...... *G06F 11/3684* (2013.01); *G06F 11/3616* (2013.01); *G06N 3/006* (2013.01);
(Continued)

(58) Field of Classification Search
CPC . G06F 11/3684; G06F 11/3616; G06N 20/00; G06N 3/006; G06N 5/04; G06Q 10/00
(Continued)

(56) References Cited

U.S. PATENT DOCUMENTS

2007/0067293 A1* 3/2007 Yu ..................... G06F 16/3346
2011/0125734 A1 5/2011 Duboue et al.
(Continued)

OTHER PUBLICATIONS

Binkley et al., "Learning to Rank Improves IR in SE" 2014 IEEE International Conference on Software Maintenance and Evolution, pp. 441-445. (Year: 2014).*
(Continued)

*Primary Examiner* — Vincent Gonzales
*Assistant Examiner* — Chase P. Hinckley
(74) *Attorney, Agent, or Firm* — Cantor Colburn LLP; Will Stock (57) ABSTRACT

A computer-implemented method is provided for determining quality metrics for a question set. In an implementation, a test question set model may be produced based upon calculated quality metrics of a test question set with respect to a test corpus, and including features representing quality metrics. The test question set model may be compared to a baseline question set model based on a distance calculated between one or more projected model features of the baseline question set model and one or more runtime model features of the test question set model. Contents of the test question set may be adjusted based upon the calculated distance.

5 Claims, 6 Drawing Sheets (51) Int. Cl.
*G06N 3/00* (2006.01)
*G06N 5/04* (2006.01)
*G06Q 10/06* (2012.01)

(52) U.S. Cl.
CPC ............... *G06N 5/04* (2013.01); *G06N 20/00* (2019.01); *G06Q 10/0639* (2013.01)

(58) Field of Classification Search
USPC .......................................................... 706/45
See application file for complete search history.

(56) References Cited

U.S. PATENT DOCUMENTS

| | | |
|---|---|---|
| 2014/0075004 A1 | 3/2014 | Van Dusen et al. |
| 2014/0141401 A1 | 5/2014 | Agarwal et al. |
| 2014/0272884 A1 | 9/2014 | Allen et al. |
| 2014/0272909 A1* | 9/2014 | Isenssee ................... G09B 7/02 434/362 |

OTHER PUBLICATIONS

D'Haro et al., "A Robust Spoken Q&A System with Scarce In-Domain Resources" Dec. 16-19, 2015 Proceedings of APSIPA Annual Summit and Conference, pp. 47-53. (Year: 2015).*

Whittaker et al., "A Statistical Classification Approach to Question Answering using Web Data" 2005 Proceedings of the 2005 International Conference on Cyberworlds, Pages (Year: 2005).*

Hoang et al., "L2S: Transforming natural language questions into SQL queries" Oct. 8-10, 2015 Seventh International Conference on Knowledge and Systems Engineering, pp. 85-90. (Year: 2015).*

List of IBM Patents or Patent Applications Treated as Related; Feb. 29, 2016, 2 pages.

U.S. Appl. No. 15/001,698, filed Jan. 20, 2016, Entitled: System and Method for Determining Quality Metrics for a Question Set, First Named Inventor: Nadiya Kochura.

Yao et al., "Benchmarking Ontologies: Bigger or Better?" Jan. 13, 2011, PLOS Computational Biology, vol. 7, Issue 1, pp. 1-15 (Year: 2011).

* cited by examiner

FIG. 6

SYSTEM AND METHOD FOR DETERMINING QUALITY METRICS FOR A QUESTION SET

DOMESTIC PRIORITY

This application is a continuation of U.S. patent application Ser. No. 15/001,698, filed Jan. 20, 2016, the disclosure of which is incorporated by reference herein in its entirety.

TECHNICAL FIELD

The present disclosure generally relates to coverage of question sets on a corpus, and more particularly relates to systems and methods for determining quality metrics for a question set.

BACKGROUND

Question answering systems may rely heavily on adequate question sets to test the question answering systems. Question sets may also be used train the question answering system for better results. Question sets may accurately test and cover a particular domain with a broad range of diverse questions.

SUMMARY

According to an implementation, a computer-implemented method may include producing, by a processor, a test question set model based upon, at least in part, calculated quality metrics of a test question set with respect to a test corpus, and including a plurality of test question set model features representing quality metrics for the test question set. The method may also include comparing, by the processor, the test question set model to a baseline question set model based on calculating a distance between one or more projected model features of the baseline question set model and one or more runtime model features of the test question set model. The method may also include adjusting, by the processor, contents of the test question set based upon, at least in part, the calculated distance between the projected model features of the baseline question set model and the runtime model features of the test question set model.

One or more of the following features may be included. The baseline question set model may be produced based on calculated quality metrics of a baseline question set with respect to a baseline corpus and includes a plurality of baseline question set model features representing quality metrics for the baseline question set. Machine learning may be applied to tune the test question set model by rewarding prominent features of the test question set and penalizing less prominent features of the test question set. The baseline question set model may be selected based upon, at least in part, a domain distance between the baseline corpus and the test corpus. The calculated quality metrics for the test question set model may be calculated using a static question set analysis tool.

The method may further include projecting the test question set accuracy from the runtime model features of the baseline question set by analyzing the distance between the baseline question set model and the test question set model. The method may further include identifying a level of coverage for the test question set. The method may further include identifying a level of non-coverage for the test question set.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
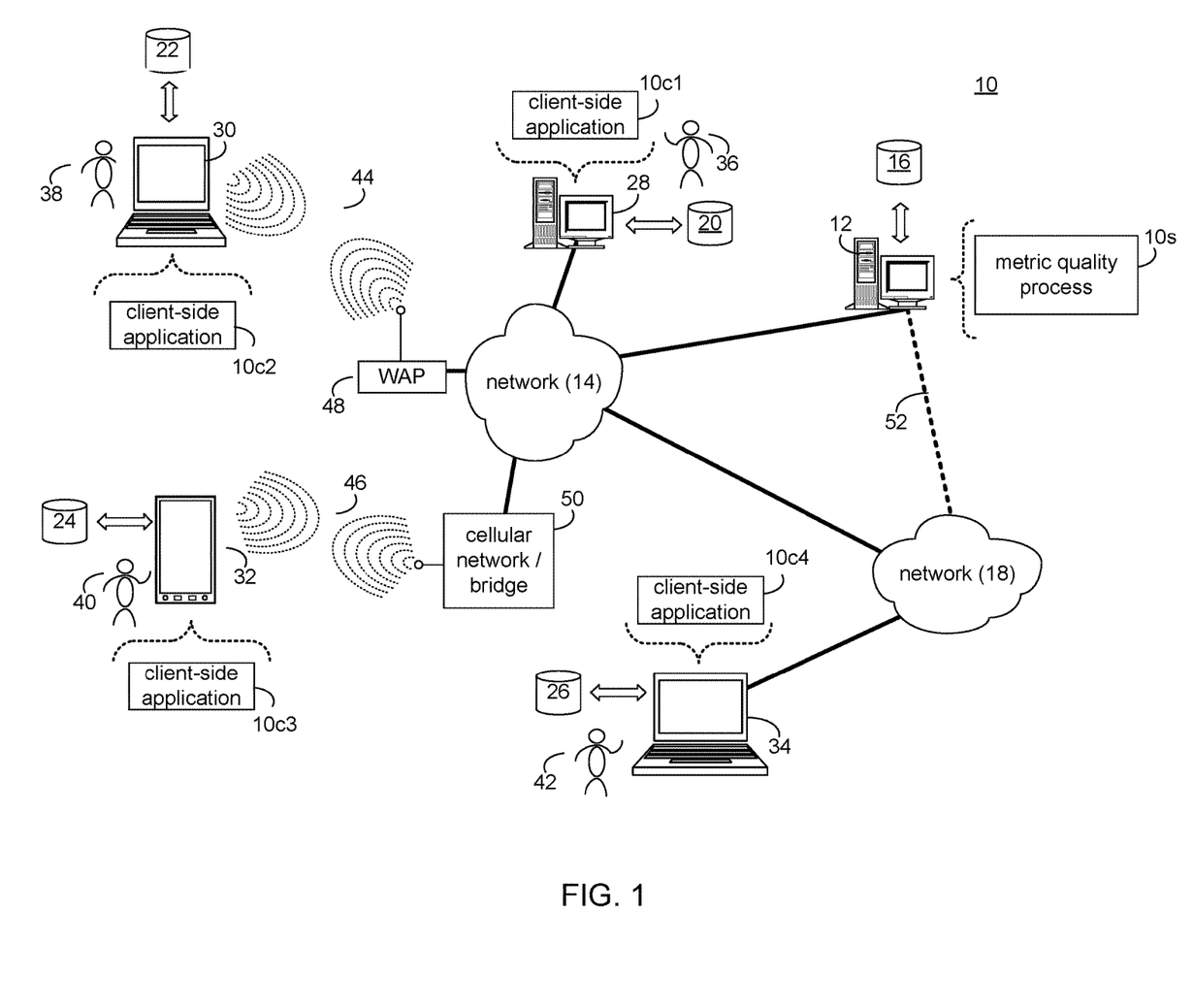
FIG. 1 is a diagrammatic view of a distributed computing network including a computing device that executes a metric quality process according to an implementation of the present disclosure.

Referring to FIG. 1, there is shown metric quality process 10. For the following discussion, it is intended to be understood that metric quality process 10 may be implemented in a variety of ways. For example, metric quality process 10 may be implemented as a server-side process, a client-side process, or a server-side/client-side process.

For example, metric quality process 10 may be implemented as a purely server-side process via metric quality process 10s. Alternatively, metric quality process 10 may be implemented as a purely client-side process via one or more of client-side application 10c1, client-side application 10c2, client-side application 10c3, and client-side application 10c4. Alternatively still, metric quality process 10 may be implemented as a server-side/client-side process via metric quality process 10s in combination with one or more of client-side application 10c1, client-side application 10c2, client-side application 10c3, and client-side application 10c4. In such an example, at least a portion of the functionality of metric quality process 10 may be performed by metric quality process 10s and at least a portion of the functionality of metric quality process 10 may be performed by one or more of client-side application 10c1, 10c2, 10c3, and 10c3.

Accordingly, metric quality process 10 as used in this disclosure may include any combination of metric quality process 10s, client-side application 10c1, client-side application 10c2, client-side application 10c3, and client-side application 10c4.

Figure 2:
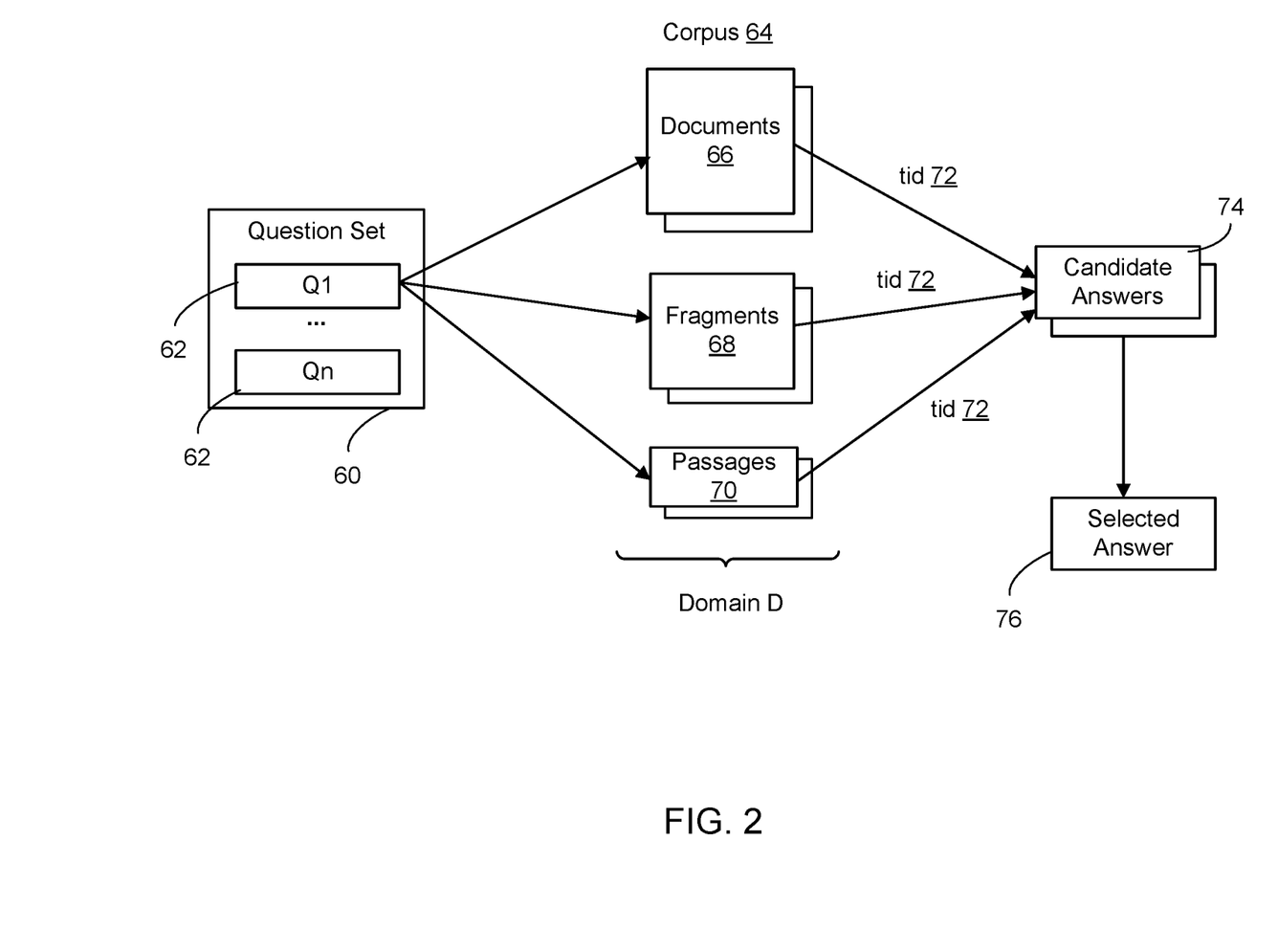
FIG. 2 is a diagrammatic view of a question set, a corpus, and answers according to an implementation of the present disclosure.

FIG. 2 depicts an example of a question set 60 that can include a plurality of questions 62 (e.g., Q1 to Qn) in a question answering computer system. A corpus 64 can include various documents 66, fragments 68 (e.g., web pages), and/or passages 70 related to a domain D from which answers are desired. The domain D may be associated with a particular field of interest, such as medical information, insurance coding, and the like. Portions of the corpus 64 may be tagged with identifiers 72 used to construct candidate answers 74. An answer selection process that is known in the art can determine a selected answer 76 from the candidate answers 74. The question set 60 may include thousands of questions (e.g., tens of thousands, hundreds of thousands, etc.). In embodiments, the metric quality process 10 can be used to determine whether the questions 62 within the question set 60 provide a sufficient level of coverage of the corpus 64. For example, is some applications, the corpus 64 must contain 100% coverage for all questions 62 contained in the question set 60. In other applications, the level of coverage is deemed sufficient if 70% of the questions 62 contained in the question set 60 can be answered correctly using the corpus 64.

Figure 3:
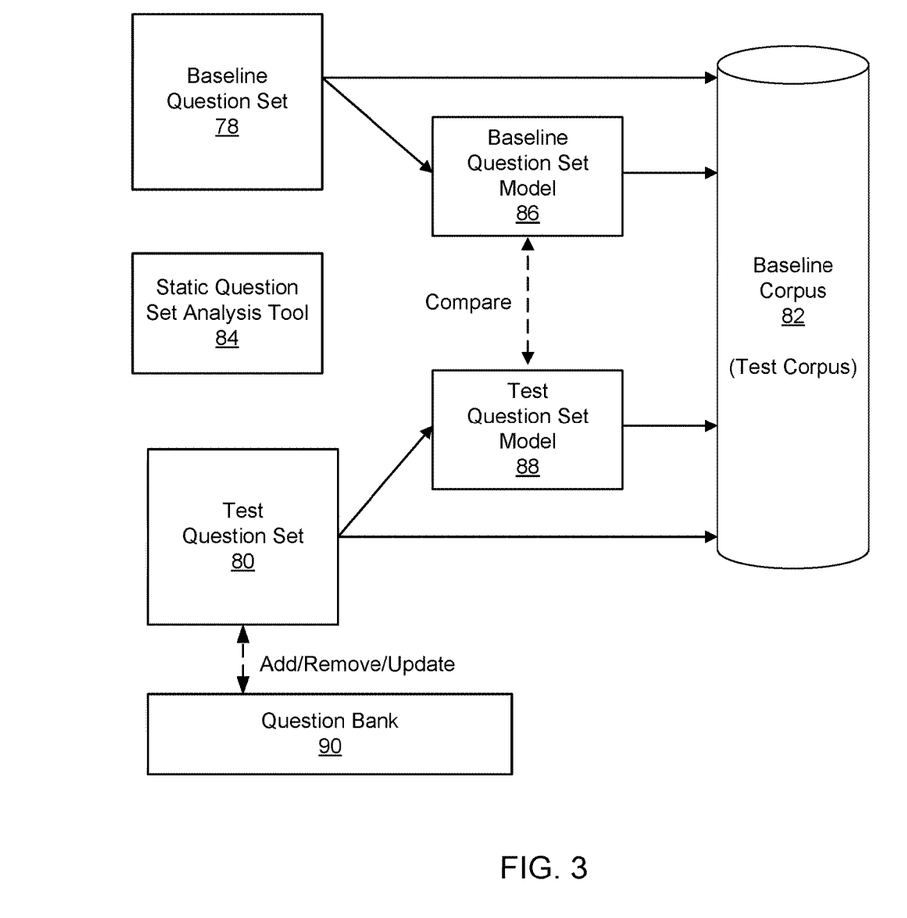
FIG. 3 is a diagrammatic view of a baseline question set and a test question set for a shared baseline corpus according to an implementation of the present disclosure.

FIG. 3 depicts an example of a baseline question set 78 and a test question set 80 that are analyzed with respect to a same baseline corpus 82. A static question set analysis tool 84 can be used to determine a plurality of metrics of the baseline question set 78 with respect to the baseline corpus 82 as a baseline question set model 86. The baseline corpus 82 may also be a test corpus with respect to the test question set 80. The static question set analysis tool 84 can be used to determine a plurality of metrics of the test question set 80 with respect to the test corpus (i.e., baseline corpus 82 in this example) as a test question set model 88. The contents of the test question set 80 differ from the baseline question set 78. The test question set model 88 can be compared to the baseline question set model 86 to determine how similar the performance of test question set 80 is to the baseline question set 78. For example, coverage of the test question set 80 may be deemed higher or lower than coverage provided by the baseline question set 78. A question bank 90 can be accessed to add, remove, or update questions from the test question set 80, and a new iteration of the test question set model 88 can be run for further comparison against the baseline question set model 86.

Figure 4:
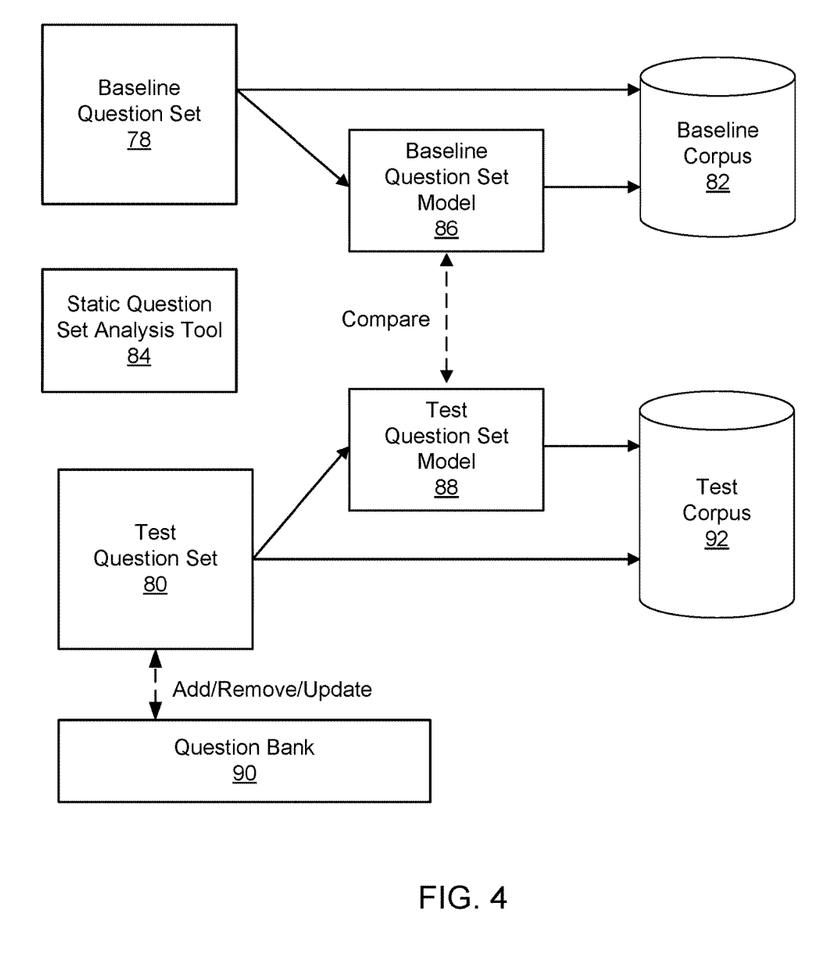
FIG. 4 is a diagrammatic view of a baseline question set and a test question set for a separate baseline corpus and test corpus according to an implementation of the present disclosure.

In the example of FIG. 4, the test question set 80 is analyzed with respect to test corpus 92 to determine test question set model 88. The test corpus 92 is a different corpus and may be from a different domain than the baseline corpus 82. Even though the domains may be different for baseline corpus 82 and test corpus 92, the metric quality process 10 enables tuning of the test question set 80 by adding, removing and/or updating question content, for example, to align metrics of the test question set model 88 with the baseline question set model 86.

Figure 5:
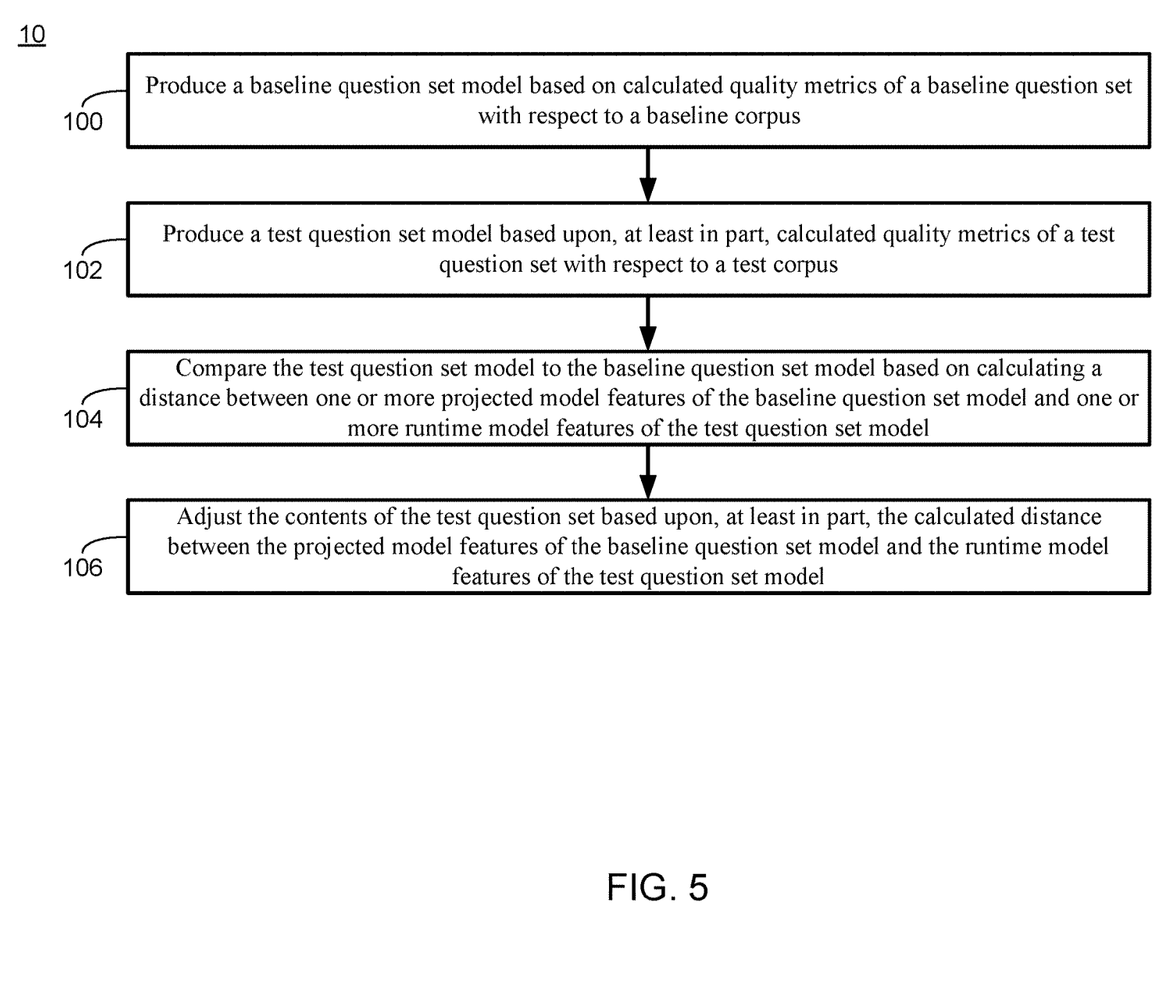
FIG. 5 is a flowchart of the metric quality process of FIG. 1, according to an implementation of the present disclosure.

Referring also to FIG. 5 with continued reference to FIGS. 1-4, and as will be discussed in greater detail below, metric quality process 10 may produce 100 a baseline question set model 86 based on calculated quality metrics of a baseline question set 78 with respect to a baseline corpus 82 and includes a plurality of baseline question set model features representing quality metrics for the baseline question set 78. Metric quality process 10 may also produce 102 a test question set model 88 based upon, at least in part, calculated metrics of a test question set 80 with respect to a test corpus 92 (which in some embodiments is equivalent to baseline corpus 82) and includes a plurality of test question set model features representing quality metrics for the test question set 80. Metric quality process 10 may further compare 106 the test question set model 88 to the baseline question set model 86 based on calculating a distance between one or more projected model features of the baseline question set model 86 and one or more runtime model features of the test question set model 88. Metric quality process 10 may also adjust 108 contents (e.g., questions) of the test question set 80 based upon, at least in part, the calculated distance between the projected model features of the baseline question set model 86 and the runtime model features of the test question set model 88.

Metric quality process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of metric quality process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access metric quality process 10 directly through network 14 or through secondary network 18. Further, metric quality process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 48. Similarly, mobile computing device 32 is shown wirelessly coupled to network 14 via wireless communication channel 46 established between mobile computing device 32 and cellular network/bridge 50, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 44 between laptop computer 30 and WAP 48. Additionally, personal computer 34 is shown directly coupled to network 18 via a hardwired network connection.

As generally discussed above with reference to FIG. 5, metric quality process 10 may define 100 a baseline question set model based upon, at least in part, a baseline question set for a baseline corpus and including a plurality of baseline question set model features representing quality metrics for the baseline question set. Metric quality process 10 may also produce 102 a test question set model based upon, at least in part, calculated metrics for a test question set and a test corpus, and including a plurality of test question set model features representing quality metrics for the test question set. Metric quality process 10 may also use 104 the test question set model as a test dataset in applying the baseline question set model to the test corpus. Metric quality process 10 may further calculate 106 a distance between one or more projected model features of the baseline question set model and one or more runtime model features of the test question set model. Metric quality process 10 may also adjust 108 the test question set based upon, at least in part, the calculated distance between the projected model features of the baseline question set model and the runtime model features of the test question set model. Metric quality process 10 may further apply 110 machine learning to tune the test question set based upon, at least in part, the baseline question set model and the test question set model.

A corpus may generally be defined as a collection of written texts. More particularly, a corpus may include a systematic collection of naturally occurring texts, including both written and spoken language. The structure and contents of the corpus may be restricted to particular text types, to one or more varieties of English (or other languages), and/or to certain time periods. Any number of corpora may exist based upon, at least in part, the structure and contents of the particular corpus. Within a question answering system, a question set may be used to produce answers based upon, at least in part, text from a corpus associated with the question answering system. A question set to be used to test a particular corpus associated with the question answering system may be produced in a variety of ways. For example, a question set may be consumer or user provided. A question set may be generated by an automation tool from a template based upon, at least in part, the corpus. A question set may also be manually input by corpus domain experts. This is not meant to be a limitation of this disclosure, as the question set may be produced and/or provided in a variety of manners. Because the question set may be used to extract answers from the corpus, the question set may be robust in nature and desirably may properly cover each aspect of the particular corpus.

The baseline corpus 82 may include a single corpus, and/or may include more than one corpora. As described above, a baseline question set 78 of the baseline question set model 86 may be provided and/or produced for a baseline corpus 82. As the baseline question set 78 is used to test the baseline corpus 82, baseline accuracy and competency level metrics may be produced for the baseline question set 78, as example of feature of the baseline question set model 86 that may represent quality metrics for the baseline question set 78. For example, for each question included within the baseline question set 78, an amount of content included within the baseline corpus 82 "touched" by the question may be identified. That is, any content within the baseline corpus 82 that may be related to the question and/or may at least partially answer the question may be identified. Any content within the baseline corpus 82 that may be related to the question and/or may at least partially answer the question may be considered a possible candidate answer. Candidate answers may be associated with a unique identifier (e.g., using identifiers 72) of that portion of the baseline corpus 82. In this regard, when texts (e.g., written, spoken, etc.) are incorporated into a corpus, each text, as well as subparts of the text (e.g., which may include any subpart such as a chapter, section, page, paragraph, sentence, phrase, etc., may be assigned a unique identifier). The accuracy and competency of the candidate answers in relation to each question (i.e., how well the candidate answer answers the question) may be used to produce baseline accuracy and competency level metrics (e.g., which may singly and/or collectively represent quality metrics) associated with the baseline question set 78. For example, in an embodiment, a question and answer system may be used to estimate the accuracy of a given question set by evaluating the performance of the system against a ground truth, which may contain answers to the questions in the question set. Metric quality process 10 may use the baseline accuracy and competency level metrics to produce or define the baseline question set model 86. The baseline question set model 86 may be defined with a set of features. The set of features may include metrics, such as the baseline accuracy and competency level metrics, that may be produced in the context of a given corpus (e.g., the baseline corpus 82). The baseline question set model 86 may include the baseline accuracy and competency level metrics, e.g., as baseline question set model features representing quality metrics for the baseline question set 78.

The test corpus 92 may include the same corpus as the baseline corpus 82, may include a modification of the baseline corpus 82, or may include a different corpus (e.g., which may be related and/or unrelated to the baseline corpus 82). As with the baseline corpus 82, the test corpus 92 may include a single corpus and/or may include more than one corpora. The calculated quality metrics may include, for example, corpus coverage metrics, corpus non-coverage metrics, a weak coverage rate, an accuracy rate of the test question set 80, and a recall rate of the test question set 80, and breadth and depth metrics (e.g., the size of the vocabulary and grammar of the corpus). This list of calculated quality metrics is not meant to be a limitation of this disclosure, as other possible calculated quality metrics may be included. Singly, or collectively, the calculated quality metrics may include test question set model features representing quality metrics for the test question set 80.

Each metric may be calculated using the static question set analysis tool 84. The static question set analysis tool 84 may calculate quality metrics for the test question set 80 and the test corpus 92 to produce the test question set model 88. For example, for each question included within the test question set 80, possible candidate answers with associated unique identifiers may be selected from the test corpus 92. Metric quality process 10 may also identify how much of the test corpus 92 has multiple cross-coverage questions, including identifying how much of the test corpus 92 is "touched" by the test question set 80. In this manner, metric quality process 10 may identify how much of the test corpus 92 is "covered" and how much of the test corpus 92 is "not covered" by the given question set. In some implementations, the degree of coverage, degree of non-coverage, and degree of multiple cross-coverage may be represented as a heat map, e.g., which may generally indicate the number of questions covering each portion of the test corpus 92.

As generally discussed above, metric quality process 10 may identify a level of coverage for the test question set 80.

Using the static question set analysis tool 84, metric quality process 10 may calculate a coverage rate of the given question set by dividing a total number of unique identifiers selected from a corpus for the given question set by the total number of unique identifiers in the corpus (i.e., the total number of possible candidate answers included within the corpus). In this manner, metric quality process 10 may identify the level of coverage for the given question set. As generally discussed above, the unique identifiers (e.g., identifiers 72) may include identifiers associated with each text and/or subpart (e.g., chapter, section, page, paragraph, sentence, phrase, etc.) of each text included within the test corpus 92. The unique identifiers may be associated with each text and/or subpart of each text when the text is initially incorporated into the corpus, and/or at another time.

Metric quality process 10 may further identify a level of non-coverage for the test question set 80. Using the static question set analysis tool 84, metric quality process 10 may further calculate a non-coverage rate of the test question set 80 by dividing a number of unique identifiers remaining that were not selected from the test corpus 92 for the test question set 80 by the total number of unique identifiers in the test corpus 92. In this manner, metric quality process 10 may identify the level of non-coverage for the test question set 80.

Further, metric quality process 10 may calculate a weak coverage rate for the test question set 80 by calculating a percentage of unique identifiers that may be mapped to failed questions (i.e., questions of the test question set 80 that failed to "touch" an answer from the test corpus 92).

Metric quality process 10 may also calculate an accuracy rate of the test question set 80 by dividing a number of correct answers by a number of all possible answers from the test corpus 92. Metric quality process 10 may further calculate a recall rate of the test question set 80 by dividing a number of correct answers by a number of all correct answers from the test corpus 92.

The baseline corpus 82 may be selected based upon, at least in part, an optimal domain distance calculated between the baseline corpus 82 and the test corpus 92. For example, in an embodiment, the domain distance may be calculated by establishing the domain hierarchy that the application would need to support. For example, in the insurance domain, the car insurances from various insurance agencies may have a relatively small domain distance. As such, the baseline question set 78 may be selected from closest corpus in the domain hierarchy. In an embodiment, a graph may be created that may allow the number of nodes to be counted between the different domains. The less distant the baseline corpus 82 is from the test corpus 92, the more accurate the metric comparison between the baseline question model 86 and the test question set model 88. The domain distance may be included within the test question set model 88.

In an example embodiment, the test question set model 88 may be built for a given test question set 80. The question set static metrics may be calculated and the test question set 80 may be run through a quality assurance system to calculate the performance metrics for a test dataset. Static metrics and performance results produced may be compared with baseline metrics. If the distance is not acceptable, the test question set 80 may be modified and the next iteration (i.e., including the modified test question set) may be run through the quality assurance system. Where the baseline question model 86 and the test question set model 88 are implemented as vectors, a vector distance calculation can be used to compare the baseline question model 86 and the test question set model 88. The baseline question set metrics may be used to calculate the difference metrics vector. The difference metrics vector values may be used to evaluate if the test question set model 88 is qualified for predicted performance for the test domain 92. Metric quality process 10 may further calculate a distance between one or more projected model features of the baseline question set 78 and one or more runtime model features of the test question set model 88. Calculating the distance between the projected model features of the baseline question set model 86 and the runtime model features of the test question set model 88 may include analyzing the distance between the model features of the baseline question set model 86 (i.e., which may represent quality metrics for the baseline question set 78) and the model features of the test question set model 88 obtained at runtime (e.g., assessing the ground truth answers to the test question set 80 relative to the test question set model features calculated using static analysis). The baseline question set model 86 may be used for comparison with the test question set model 88 to evaluate the calculated quality metrics above. This may be beneficial to produce qualifying training and testing of the given question set during new domain/corpus adaptation and to test changes to question answering systems. The baseline accuracy and competency level metrics included within the baseline question set model 86 may be compared to the calculated quality metrics of the test question set model 88. This may help predict the accuracy of the given question set. For example, calculating the distance between the projected accuracy and the runtime accuracy between the test question set model 88 and the baseline question set model 86 may include calculating how far the calculated quality metrics are from the baseline accuracy and competency level metrics included within the baseline question set model 86 in reaching a baseline goal of 70% accuracy (and/or any other goal established as a desired accuracy level). Metric quality process 10 may further determine whether the calculated quality metrics meet specific application requirements. For example, 100% corpus coverage of a question set may be a requirement for a "quiz type" of question answering system. However, lesser corpus coverage may be suitable for other question answer systems.

Metric quality process 10 may adjust the contents of the test question set 80 based upon, at least in part, the calculated distance between the projected model features of the baseline question set model 86 and the runtime model features of the test question set model 88. For example, new questions may be added to the given question set. Further, questions may be removed from the given question set. Further, individual questions within the test question set 80 may be modified. In this manner, the test question set model 88 may be adjusted to more accurately test as much of the test corpus 92 as possible.

Metric quality process 10 may apply machine learning to tune the test question set 80 based upon the baseline question set model 82 and the test question set model 88. For example, various known machine learning algorithms may be applied to tuning the test question set model 88, such as a logistic regression algorithm. The different question sets may include questions that are different from the questions included within the baseline question set 78. By way of example, tuning the test question set model 88 may work to establish or identify a common language (e.g., a common model) for comparing different corpora. This common language may be generated by a training process that may include the accuracy and competency metrics (e.g., the model features of the test question set model 88 and the baseline question set model 86) and/or the difference between the accuracy and competency metrics as input.

Thus, the accuracy and competency level metrics may not be affected by the model generation, but may affect the model generation. As described above, the different question sets may be produced and/or provided in a variety of manners, including but not limited to, user provided, automation tool generated, manually provided by domain experts, etc. The different question sets may be used to extract answers from the test corpus 92. Different questions from different question sets may extract different candidate answers from the test corpus 92. Different question sets may include different questions and/or may include rephrased questions from the test question set 80. In a similar manner as described above, for each question included within the different question sets, an amount of content included within the test corpus "touched" by the question in the different question sets may be identified. That is, any content within the test corpus 92 that may be related to the question and/or at least partially answer the question may be identified as possible candidate answers. As generally described above, possible candidate answers may be associated with a unique identifier. Metric quality process 10 may apply machine learning from the possible candidate answers associated with the different question sets for the test corpus 92 to train the test question set model 88. Applying 110 machine learning to tune the test question set model 88 using different question sets for the test corpus 92 may include rewarding prominent features of the test question set 80 and penalizing less prominent features of the test question set 80. For example, in an embodiment machine learning models may, as part of their operation, decide on different weights (e.g., prominences) for the various features used as input, and, as such, may follow from the application of the machine learning algorithm to tune the test question set model 88. Features of the test question set model 88 may include the accuracy and competency level metrics. In this way, the test question set model 88 may become more robust by introducing new questions from the different question sets that "touch" or "cover" other areas of the test corpus 92 and/or may introduce rephrased questions that may provide different answers from the test corpus 92. Further, the test question set accuracy may be projected from the runtime model features by analyzing the distance between the baseline question set model 86 and the test question set model 88.

Figure 6:
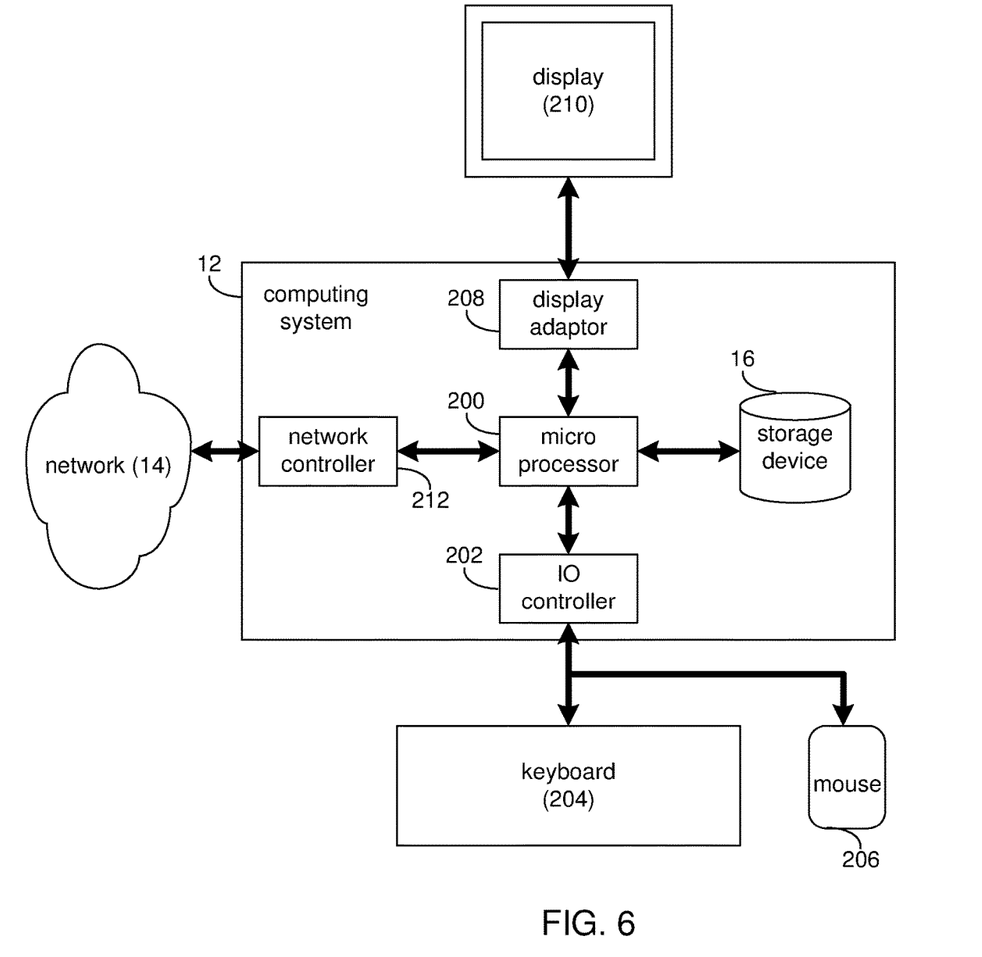
FIG. 6 is a diagrammatic view of the computing device of FIG. 1, according to an implementation of the present disclosure.

Referring also to FIG. 6, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, metric quality process 10 may be substituted for computing device 12 within FIG. 6, examples of which may include but are not limited to client electronic devices 28, 30, 32, 34.

Computing system 12 may include microprocessor 200 configured to e.g., process data and execute instructions/code for metric quality process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
producing, by a processor, a test question set model based upon, at least in part, calculated quality metrics of a test question set with respect to a test corpus, and including a plurality of test question set model features representing quality metrics for the test question set in the test question set model to define coverage between the test question set and the test corpus based on one or more possible candidate answers to the test question set identified from the test corpus;
identifying a level of coverage for the test question set by dividing a total number of unique identifiers selected from the test corpus for the test question set by the total number of unique identifiers from the test corpus in producing the test question set model;
identifying a level of non-coverage for the test question set by dividing a number of unique identifiers remaining that were not selected from the test corpus for the test question set by the total number of unique identifiers from the test corpus in producing the test question set model;
comparing, by the processor, the test question set model to a baseline question set model based on calculating a distance between one or more projected model features of the baseline question set model and one or more runtime model features of the test question set model, wherein the test question set model and the baseline question set model each comprise vectors and the distance comprises a vector distance difference;
adjusting, by the processor, contents of the test question set based upon, at least in part, the calculated distance between the projected model features of the baseline question set model and the runtime model features of the test question set model; and
testing a question answering computer system based on the adjusted contents of the test question set.

2. The computer-implemented method of claim 1, wherein the baseline question set model is produced based on calculated quality metrics of a baseline question set with respect to a baseline corpus and includes a plurality of baseline question set model features representing quality metrics for the baseline question set.

3. The computer-implemented method of claim 2, wherein the baseline question set model is selected based upon, at least in part, a domain distance between the baseline corpus and the test corpus as a graph difference between domains of the baseline corpus and the test corpus.

4. The computer-implemented method of claim 1, further including:
- projecting the test question set accuracy from the runtime model features of the baseline question set by analyzing the distance between the baseline question set model and the test question set model.

5. The computer-implemented method of claim 1, further including:
- tuning the test question set model by rewarding prominent features of the test question set and penalizing less prominent features of the test question set.

\* \* \* \* \*